United States Patent [19]

Lewyckyj

[11] 3,716,132
[45] Feb. 13, 1973

[54] THREAD-REINFORCED LAMINATED STRUCTURE HAVING LINES OF WEAKNESS AND METHOD AND APPARATUS FOR CREATING LINES OF WEAKNESS

[75] Inventor: Roman Lewyckyj, Philadelphia, Pa.

[73] Assignee: Scott Paper Company, Delaware County, Pa.

[22] Filed: Nov. 20, 1970

[21] Appl. No.: 91,240

[52] U.S. Cl. ............................206/58, 83/9, 83/678, 83/695, 93/58.2, 161/57, 161/84, 161/85, 161/88, 161/89, 161/92, 161/93, 161/117, 161/123, 161/124, 161/156, 206/59 R
[51] Int. Cl. ..............................................B32b 5/02
[58] Field of Search ........83/9, 678, 695; 161/84, 88, 161/89, 92, 94, 152, 154, 156, 117, 123, 124, 57, 85; 93/58, 58.2; 100/124; 206/58, 59

[56] References Cited

UNITED STATES PATENTS

| | | | |
|---|---|---|---|
| 2,774,127 | 12/1956 | Secrist | 161/156 X |
| 3,255,649 | 6/1966 | Buttery | 83/695 X |
| 3,222,237 | 12/1965 | McKelvy | 161/95 X |
| 3,205,750 | 9/1965 | Strange | 83/695 X |
| 3,047,444 | 7/1962 | Harwood | 161/156 X |
| 2,994,940 | 8/1961 | Ferrel et al. | 161/92 X |

Primary Examiner—Robert F. Burnett
Assistant Examiner—M. E. McCamish
Attorney—Martin L. Faigus, William J. Foley, John W. Kane, Jr. and John A. Weygandt

[57] ABSTRACT

A laminated structure comprising at least one ply of cellulosic wadding with reinforcing threads secured thereto has a plurality of spaced lines of perforations separating discrete sheets of the laminated structure. Each line of perforations is defined by a series of spaced, discrete cuts spaced apart by uncut regions. The tensile strength of segments of reinforcing threads disposed in the uncut regions is substantially lower than the tensile strength of segments of reinforcing threads disposed outside of the uncut regions to thereby define lines of weakness along the lines of perforations. Method and apparatus for creating the above-described lines of weakness in the laminated structure by applying a crushing force in at least uncut regions to substantially weaken the segments of reinforcing threads disposed in the uncut regions.

23 Claims, 10 Drawing Figures

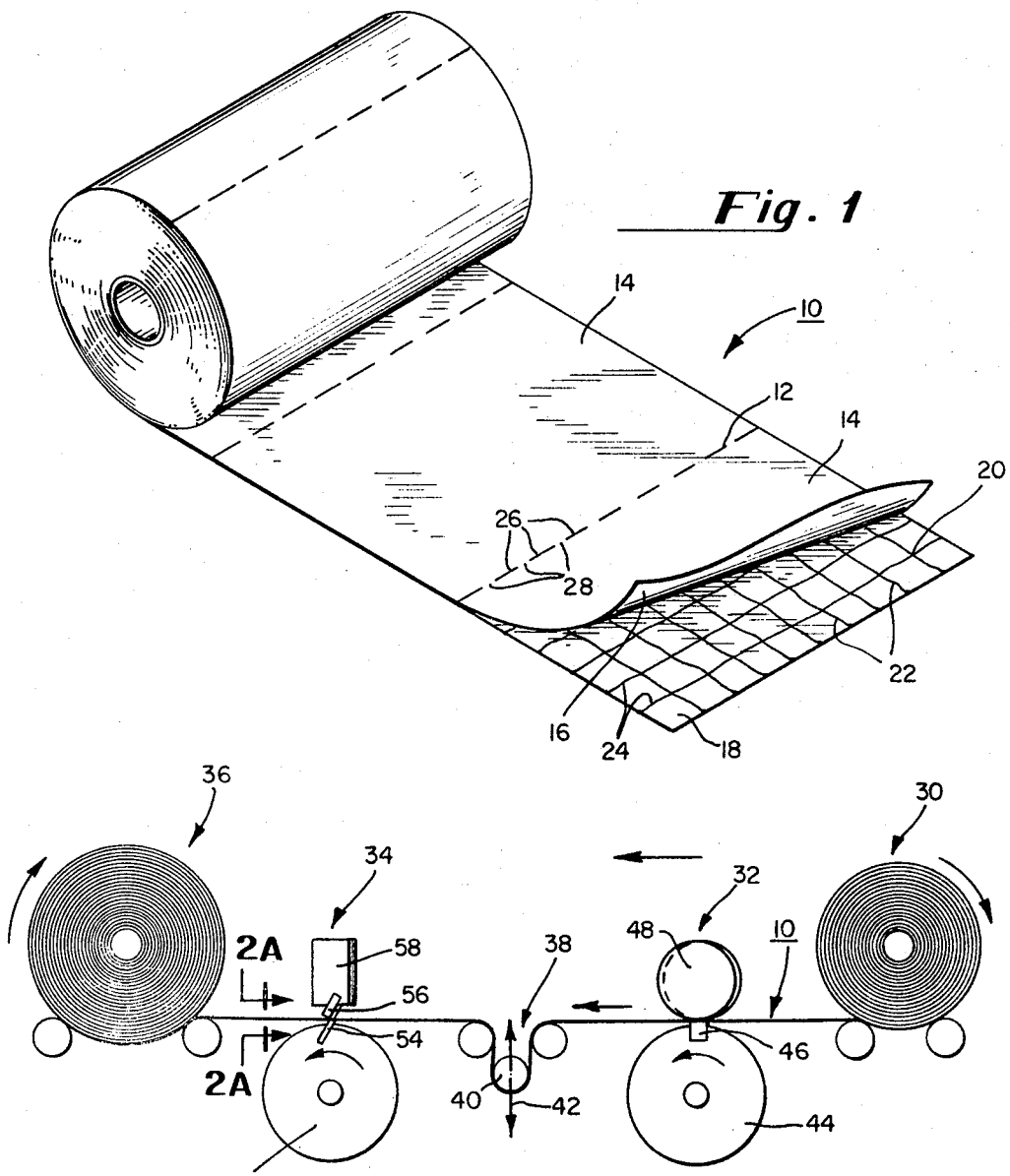
Fig. 1
Fig. 2
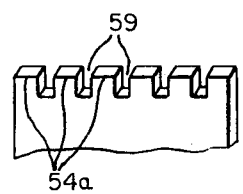
Fig. 2A
INVENTOR.
ROMAN LEWYCKYJ
BY
ATTORNEY.

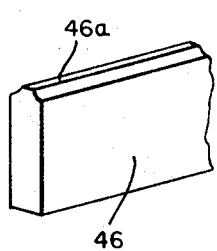
Fig. 3A
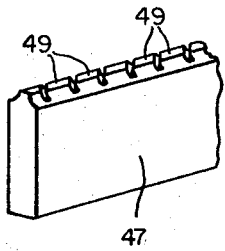
Fig. 3B
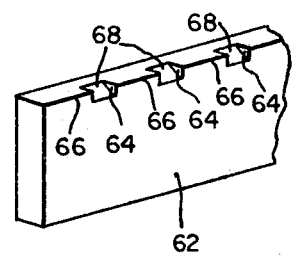
Fig. 5
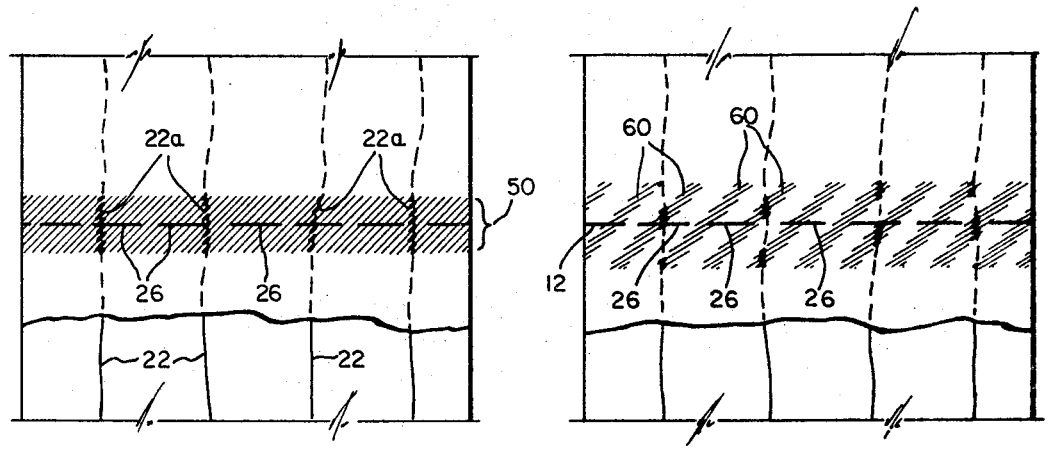
Fig. 4A
Fig. 4B
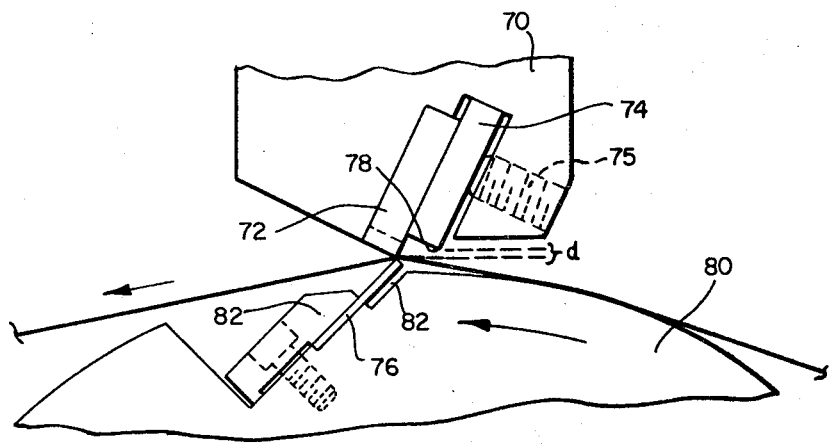
Fig. 6
INVENTOR.
ROMAN LEWYCKYJ
ATTORNEY.

THREAD-REINFORCED LAMINATED STRUCTURE HAVING LINES OF WEAKNESS AND METHOD AND APPARATUS FOR CREATING LINES OF WEAKNESS

BACKGROUND OF THE INVENTION

1. Field of the Invention

This invention relates to a laminated structure comprising at least one ply of cellulosic wadding with reinforcing threads secured thereto and having at least one line of weakness therein, and to methods and apparatus for forming said lines of weakness. More specifically, this invention relates to a laminated structure comprising at least one ply of cellulosic wadding with reinforcing threads secured thereto, and having at least one line of weakness therein defined by a series of spaced discrete cuts separated by uncut regions, wherein the tensile strength of segments of the reinforcing threads disposed in the uncut regions is substantially lowered to permit easy separation of the laminated structure along the lines of weakness; and to methods and apparatus for creating the lines of weakness.

2. Description of the Prior Art

Substantial interest exists in developing low cost, nonwoven base sheets having substantial strength and durability to be utilized in replacing conventional higher cost textile materials in manufacturing products such as towels, wiping materials, bibs, aprons, and many other products wherein disposability is a desired feature. Scrim-reinforced paper laminates, as exemplified in U.S. Pat. No. 3,072,511, have been effectively utilized in disposable garments and in sanitary paper products, such as paper towels. Products such as paper towels are often packaged in continuous roll form with spaced lines of perforations defining discrete sheets which are separable from the main roll along said lines.

In conventional perforating methods, a line of perforations is formed by simply cutting, or punching through an article at spaced intervals to form a line of discontinuous cuts defined by cut segments separated by uncut regions. When a thread or scrim-reinforced article is perforated by conventional methods, the threads disposed in cut segments will be cut and the threads disposed in uncut regions will retain their strength and provide an impediment to separation along the line of perforations. In many instances the position of reinforcing threads in an article is such that at least a few threads will coincide with uncut regions in the lines of perforations. In such instances, the impediment to separation along the lines of perforations may result in a tearing of the body of the sheet to be separated. Also, application of a force to separate a sheet from the main roll may result in an unwinding of the roll rather than the desired separation. When reinforcing threads coincide with uncut regions it is now necessary to hold the roll against rotation with one hand while separating a sheet with the other hand. This means that one must have both hands free for separating a sheet, which in many instances, is not the situation when a sheet is desired. In view of the above-described deficiencies, new methods for forming lines of weakness in thread or scrim-reinforced articles are necessary. Applicant is not aware of any prior art techniques for forming lines of weakness in a thread or scrim-reinforced product such that threads coinciding with uncut regions between cut segments in lines of perforations do not present any impediment to separating the product along such lines.

SUMMARY OF THE INVENTION

Applicant has discovered that applying a crushing force to a laminated product comprising reinforcing threads secured to a layer of cellulosic wadding, in the region of a reinforcing thread, will substantially reduce the tensile strength of the reinforcing thread. Furthermore applicant has discovered that the crushing force will not substantially affect the integrity of the cellulosic wadding. More specifically, applicant has discovered that a crushing force can be applied to substantially destroy the tensile strength of the reinforcing threads without materially affecting the tensile strength of the layer of cellulosic wadding, i.e., the tensile strength of the crushed wadding is substantially the same, or only slightly lower than that of the uncrushed wadding, and in certain pressure ranges, the tensile strength of the crushed wadding is actually increased over that of the uncrushed wadding. Therefore, the crushing of uncut regions disposed between cut segments of lines of perforations will substantially reduce the tensile strength of any reinforcing threads disposed in such uncut regions without substantially reducing the tensile strength of the cellulosic wadding in such regions. If the tensile strength of the cellulosic wadding were also substantially reduced in the uncut regions, individual sheets of a rolled product would tend to become separated from the main roll under such low forces that the roll could virtually fall apart during normal handling operations. Also, the lines of weakness would be so weak as to prevent the sheet which has been crushed and provided with lines of perforations to be rolled in a continuous operation at a winding station.

The unique method for forming lines of weakness in a laminated structure comprising a layer of cellulosic wadding with reinforcing threads secured thereto resides in applying a crushing force in at least uncut regions interconnecting cut segments of lines of perforations for substantially reducing the tensile strength of any reinforcing threads disposed in said uncut regions without destroying the tensile strength or integrity of the layer of cellulosic wadding. The crushing force preferably is applied to the laminated structure prior to the cutting operation at a crushing station which is separate from the cutting station. The crushing force is applied either in a continuous crush region which is coextensive with the zone to be cut, or in spaced, narrow regions which are parallel to each other and which are disposed at an acute angle to the discontinuous cut line formed at the cutting station. The crushing anvil for forming the spaced, narrow crushed zones has a crushing surface separated into crushing segments by spaced serrations. The ends of each narrow zone overlap adjacent zones in a perpendicular direction to the line of perforations to insure that all reinforcing threads in the region of the lines of perforations, including those coinciding with cut sections, will be crushed.

If desired, the crushing force can be applied to the uncut regions simultaneously with the cutting operation by utilizing a specially designed cutting and crushing blade, or the crushing force can be applied subsequent to the cutting operation at a separate crushing station. As stated earlier, the crushing operation is preferably performed prior to forming the lines of perforations.

The unique laminated structure of this invention is comprised of at least one layer of cellulosic wadding with reinforcing threads secured thereto. The laminated structure has at least one line of weakness, each line of weakness being defined by a line of perforations comprising a series of spaced, discrete cuts separated by uncut regions wherein segments of reinforcing threads cross the uncut regions and have a substantially lower tensile strength than segments of the reinforcing thread disposed outside of the uncut regions. More specifically, in the most preferred embodiment of this invention, the tensile strength of segments of reinforcing threads disposed in the tab regions is substantially destroyed, whereas the tensile strength of the paper layer in the tab region remains substantially unaffected by the crushing force. The advantage of this construction has been explained earlier.

BRIEF DESCRIPTION OF THE DRAWINGS

FIG. 1 is an isometric view of a laminated product with spaced lines of weakness;

FIG. 2 is a schematic representation of a continuous production line for forming lines of weakness in a laminated structure according to the teachings of this invention;

FIG. 2A is a view of a standard perforating blade taken along line 2A—2A of FIG. 2;

FIG. 3A is an isometric view of a crushing anvil utilized in practicing one form of the method of this invention;

FIG. 3B is an isometric view of a crushing anvil utilized in practicing a second form of the method of this invention;

FIG. 4A is a fragmentary view showing a portion of a laminated structure with a line of perforations and a crushed region formed by utilizing the anvil shown in FIG. 3A;

FIG. 4B is a fragmentary view of the laminated structure having a line of perforations and series of overlapping crushed regions formed therein by utilizing the anvil shown in FIG. 3B;

FIG. 5 is an isometric view of a perforating blade utilized in a third form of the method of this invention;

FIG. 6 is a schematic representation of a method of forming lines of weakness according to still another form of the method of this invention.

DESCRIPTION OF THE PREFERRED EMBODIMENTS

Figure 7:
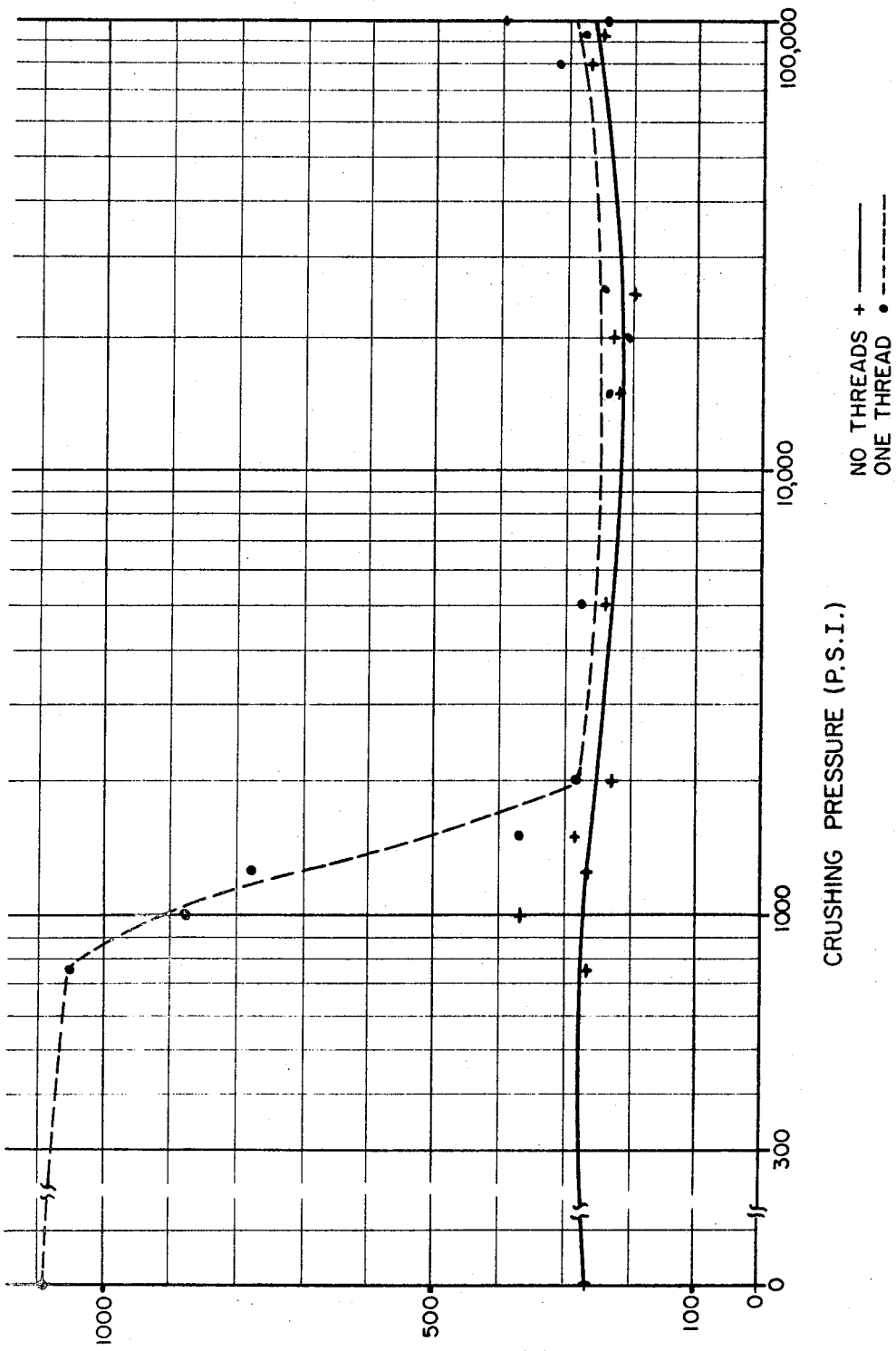
FIG. 7 is a graph illustrating the results achieved by this invention.

This invention relates to methods for forming lines of weakness in scrim or thread-reinforced laminated products, such as towels, household wipers, and the like. A roll of a thread-reinforced laminated product 10 having spaced lines of weakness 12 is shown in FIG. 1. The spaced lines of weakness 12 define individual sheets 14 which are separable from the main roll along such lines of weakness.

The laminated product 10 has outer layers of cellulosic wadding 16, 18 to which a reinforcing web 20 is adhesively secured. Each layer of cellulosic wadding 16, 18 may be single ply or multiple ply, and the reinforcing web 20 may be in any suitable form; such as interwoven threads or cross-laid threads, forming a scrim having lengthwise threads 22 and transverse threads 24. Any suitable technique for securing the reinforcing web to the cellulosic wadding can be utilized. For example adhesive can be applied to the cellulosic wadding or reinforcing web 20 according to any of the methods disclosed in U.S. Pat. No. 3,072,511, the disclosure of which is hereby incorporated by reference. Preferably, the reinforcing web 20 is passed through an adhesive bath prior to being sandwiched between respective cellulosic wadding layers 16, 18, and the adhesive on the reinforcing web adheres the cellulosic wadding plies and the reinforcing web together.

Each line of weakness 12 is comprised of a line of perforations in the form of a plurality of discrete slit or cut segments 26 separated by uncut regions 28. A plurality of punched openings can be utilized instead of the cuts or slits. The term "cut" as used in this application is intended to encompass cuts, slits, punched openings, and the like, wherein the laminated structure is severed in discrete sections.

The reinforcing web 20 may be comprised of any thread or yarn having a strength which is substantially reduced, or destroyed upon the application of crushing forces thereto. The method of this invention has been successfully employed with laminated products having reinforcing webs constructed of rayon threads (300 denier), cotton threads (40/2), glass threads coated with plastisol (344 denier), polyester threads (110 denier) and polypropylene threads. Laminated products having reinforcing webs made of threads other than those enumerated above also can be utilized. These threads are well within the purview of those skilled in the art, knowing that the critical criteria for selecting the thread is that it be susceptible of physical degradation under crushing forces, such as compressive forces.

The outer layers of cellulosic wadding are preferably made from 100 percent wood pulp fibers; however, it is contemplated that longer textile fibers can be added to the wadding to increase its strength. The outer layers 16, 18 must be susceptible of withstanding compressive loads without excessive loss of tensile strength, and cellulosic wadding plies made from 100 percent wood pulp fibers meet this criteria.

In a continuous production line process some lengthwise threads 22 will correspond with uncut regions 28 of each line of weakness 12. The method of this invention involves applying a crushing force in at least the uncut regions of the lines of perforation to substantially reduce the tensile strength of the reinforcing threads in such regions. The amount of crushing load required to weaken the reinforcing threads will depend on the type of threads being used. It is desirable to apply the lowest force possible for weakening, or substantially destroying the tensile strength of the reinforcing threads to avoid excessive wear of the crushing tools. In addition, excessively high pressures produce a glassine appearance in the product, which in most cases will be unacceptable to a consumer.

A schematic representation of a production line for perforating a thread-laminated structure 10 according to a first form of the method of this invention is shown in FIG. 2. The roll of a scrim or thread-laminated product 10 is fed from an unwind station 30 through a crushing station 32, a cutting station 34 and then to a rewind station 36. A registration control unit 38 is disposed between the crushing station 32 and cutting station 34, and is provided with a roll 40 which is adjustable into fixed positions in the directions indicated by arrow 42. This roll 40 is adjusted to control the length of travel of the laminated product 10 between the crushing station 32 and the cutting station 34 to assure that the cutting operation takes place substantially in the same region as the crushing operation. The crushed segments of the threads do not have to be in exact alignment with the lines of weakness 12; however, they should be reasonably close to assure that the individual sheets 14 can be separated along substantially straight lines. The uncut regions 28 of the lines of perforations are intended to include those regions which are in exact alignment with cut segments 26, and also those regions which are reasonably close to the lines of perforations as indicated in the preceding sentence.

The crushing station 32 is comprised of a lower anvil support roll 44 having a crushing anvil 46 connected thereto. The upper crushing surface of the anvil 46 cooperates with the surface of an upper crushing roll 48 to provide a crushing force to the laminated product 10 passing therebetween. The crushing roll 48 is skewed approximately 2½ degrees relative to the lower roll 44. The skewed arrangement causes the crushing surface of the anvil 46 to engage the periphery of the upper crushing roll 48 progressively to thereby prevent excessive jarring of the equipment.

Referring to FIG. 3A, the crushing surface 46a of the anvil 46 is a continuous, substantially planar surface. This continuous surface 46a cooperates with the surface of the upper roll 48 to form a continuous compressed region 50 (FIG. 4A) extending transversely across the laminated product 10. Wherever the compressed region coincides with a reinforcing thread 22, the thread will be crushed as shown at 22a in FIG. 4A. The laminated product is then fed through the registration control unit 38 to the cutting station 34.

The cutting station 34 is comprised of a lower carrier roll 52 having a flexible cutting blade 54 mounted therein. The flexible cutting blade 54 is mounted to pass in interference with an anvil 56, which is firmly mounted in a stationary anvil holder 58, to engage and cut the laminated product 10 passing therebetween. The anvil holder 58 and the anvil 56 mounted therein are skewed relative to the axis of lower carrier roll 52 to cause the cutting blade 54 to engage the anvil 56 progressively to thereby prevent excessive jarring of the equipment. The perforating or cutting blade 54 is of conventional design and is provided with a cutting edge which is interrupted by axially spaced grooves 59 to define discrete cutting edge sections 54a (FIG. 2A). These cutting edge segments 54a cooperate with the edge of anvil 56 to form discrete cut segments 26 (FIGS. 1 and 4A). The laminated product 10 with lines of weakness 12 formed therein is then wound into a continuous roll at rewind station 36.

Referring to FIG. 4A, the lengthwise threads 22 are all crushed in the continuous compressed region 50. Therefore, the lengthwise threads 22 which cross uncut regions 28 will be substantially weakened and will not hinder or interfere with the separation of individual sheets 14 from the main roll of the laminated product 10.

In a second preferred embodiment of this invention, the crushing anvil 47 shown in FIG. 3B, is utilized in lieu of the crushing anvil 46 shown in FIG. 3A. The crushing anvil 47 differs from crushing anvil 46 in that it is provided with a serrated crushing surface to define discrete crushing surface segments 49. The serrations are disposed at an angle of 45° to the long axis of the anvil to define planar crushing surface segments 49 disposed at 45° to the long axis of the anvil (which axis extends in the transverse direction of the laminated product 10). The area of the laminated product 10 which is compressed by the crushing anvil 47 is approximately one-half of the area which is compressed by the crushing anvil 46. By reducing the area which is compressed, the crushing force can also be reduced by approximately one-half (the crushing pressure remaining substantially the same). The crushing segments 49 of anvil 47 crush the laminated product in narrow, compressed regions 60 which are disposed at an angle of 45° to the perforated line and overlap one another in a perpendicular direction to said line to assure that all lengthwise threads 22 are crushed at or near the line defined by cut segments 26 (FIG. 4B). Although all lengthwise threads are crushed, the crushing of lengthwise threads which are also cut by cut segments 26, does not provide any useful function.

In both the first and second embodiments of this invention, the distance at the nip between rolls at the crushing station and the distance at the nip between the cutting blade and anvil can be varied to accommodate laminated structures of different thickness. Since the cutting and crushing stations are separate, the distance at the nips of both stations can be adjusted independently of each other. Therefore, the same cutting and crushing bladed and anvils can be utilized with laminated products of different thickness.

In a third preferred embodiment of this invention only these lengthwise threads 22 which coincide with uncut regions 28 along the lines of weakness are crushed. In this embodiment a separate crushing station and registration control unit are not utilized. Conventional perforating equipment is utilized with the exception that the conventional perforating blade 54 is replaced by a unique cutting and crushing blade 62 (FIG. 5). The cutting and crushing blade 62 is provided with a cutting edge interrupted by notches 64 to defined spaced cutting sections 66. The notches 64 are provided with flat crushing surfaces 68, which cooperate with the edge of the anvil 56 (FIG. 2) for crushing regions of the laminated product passing therebetween. The cutting and crushing blades 62 differs from the conventional perforating blade in that the notches 64 are substantially more shallow than the notches of the conventional perforating blade. The specific depth of the notches will depend upon the thickness of the laminated product being perforated; however, in all instances, the depth tolerance requirement is extremely close, and under normal mill conditions these tolerance requirements may be difficult to maintain. In this embodiment of the invention the portions of the laminated product 10 coinciding with the cutting segments 66 are cut, and the portions coinciding with the notches 64 are crushed. Therefore, the crushing force is only applied to threads which are not cut. In this embodiment of the invention different blades must be used for forming lines of weakness in products of different thickness.

A fourth preferred embodiment of this invention is schematically shown in FIG. 6. In this embodiment of the invention a fixed anvil holder 70 is provided for mounting a notched anvil 72 and an unnotched anvil 74. The anvils 72 and 74 are held in place by a screw 75. The notched anvil 72 is notched in substantially the same manner as the perforating blade 54 shown in FIG. 2A to define spaced edges which will cooperate with a knife edge of resilient unnotched cutting blade 76 to form the spaced cut segments 26 of the perforated line 12 (FIGS. 1, 4A). The unnotched anvil 74 has a rounded crushing edge 78 which is spaced upwardly from the spaced edge segments of notched anvil 72. The rounded crushing edge 78 cooperates with the resilient blade 76, which is spaced a distance $d$ (FIG. 6) therefrom, for crushing the laminated product 10 across its entire transverse dimension. The resilient blade is held in a lower carrier roll 80 by a jaw element 82 and is spaced from the rounded crushing edge 78 to prevent cutting of the laminated product 10 as it is carried together with the edge of the resilient blade 76 past the unnotched anvil 74. The laminated product 10 is fed past the unnotched and notched anvils at the same speed as the lower carrier roll 80 respectively. A clearance 82 is provided adjacent blade 76 to permit said blade to resiliently deflect past the notched anvil. In utilizing the device shown schematically in FIG. 6, the laminated product 10 is first crushed along substantially its entire transverse dimension by the interaction of blade 76 and anvil 74 to crush all lengthwise threads 22 extending thereacross. The laminated product is then cut in discrete segments 26 by the interaction of the resilient blade 76 and notched anvil 72. This method of forming transverse lines of weakness is substantially the same as the first method utilizing the production line of FIG. 2 with the crushing anvil 46 (FIG. 3A).

The following example is given by way of illustration only, and is not intended to limit the scope of this invention. A laminated product 10 having outer cellulosic wadding layers with a scrim reinforcing material adhesively bonded therebetween was provided. Each outer layer of cellulosic wadding consisted of two plies, and each ply had a basis weight of approximately 10.5 pounds per ream of 2,880 square feet. The reinforcing scrim was a 4 × 6, staple rayon, leno-woven web sold commercially by Chickopee Mills. The reinforcing scrim was first passed through an adhesive comprising latex (L9286 Uniroyal Naugatuck), and then adhered between the outer cellulosic wadding layers. Samples of one inch width and four inch length were placed between a hardened anvil and hardened steel plate such that the lengthwise threads 22 were crushed. Several samples were crushed at various pressures ranging from 750 psi to 100,000 psi. The samples were then cut with a perforating blade having cutting segments having a length of 0.128 inches, separated by notches having a length of approximately 0.027 inches to thereby form a line of perforations having cut segments separated by uncut, crushed regions. The crushed and cut samples were then separated into two groups; one group having no lengthwise reinforcing threads in the uncut regions, and the other group having one reinforcing thread extending through only one uncut region. These samples were then tested to determine the force required to separate each sample along the line of perforations. The results of this test are reported in tabular form below and in the graph shown in FIG. 7.

| crushing pressure (psi) | One Thread in Tab Region of One Inch Wide Sample average tensile strength (grams per one inch sample) | No. of samples tested | No Threads in Tab Region of One Inch Wide Sample average tensile strength (grams per one inch sample) | No. of samples tested |
| --- | --- | --- | --- | --- |
| 0 | 1,090 | 6 | 262 | 2 |
| 750 | 1,050 | 8 | 263 | 3 |
| 1,000 | 875 | 5 | 363 | 6 |
| 1,250 | 778 | 3 | 260 | 5 |
| 1,500 | 363 | 9 | 280 | 3 |
| 2,000 | 280 | 5 | 224 | 6 |
| 5,000 | 273 | 6 | 230 | 2 |
| 15,000 | 236 | 5 | 214 | 1 |
| 20,000 | 214 | 4 | 221 | 2 |
| 25,000 | 246 | 5 | 195 | 3 |
| 80,000 | 310 | 2 | 263 | 5 |
| 95,000 | 260 | 5 | 254 | 2 |
| 100,000 | 241 | 4 | 391 | 2 |

The samples which did not have any reinforcing threads extending through uncut regions gave a force reading of the strength along the line of perforations of the four plies of cellulosic wadding. Since all reinforcing threads were cut, they did not have any effect on the force required to separate the sample at the lines of perforations.

The results clearly indicate that for the product tested, a pressure of approximately 2,000 psi substantially weakens, or virtually destroys all of the strength of the reinforcing thread extending through an uncut region without weakening the cellulosic wadding layers. This result is indicated by the following:

1. the tensile strength of the laminated product having no reinforcing thread in the uncut regions, is substantially the same as the tensile strength of the laminated product having one thread extending in the uncut region which has been crushed; and
2. the force required to separate an uncrushed perforated sample having no threads extending through the uncut regions is substantially the same as that required to separate the samples having no threads in the uncut regions and subjected to the entire range of crushing pressures of from 750 psi to 100,000 psi.

Therefore, by the method of this invention, reinforcing threads which coincide with the uncut regions in a line of perforations are crushed and their tensile properties substantially weakened, or virtually destroyed to prevent any hindrance to the separating of individual sheets from a laminated roll product. Furthermore, the tensile strength of the cellulosic wadding layers are virtually unaffected by the application of crushing pressure.

What is claimed is:

1. A laminated structure comprising reinforcing threads disposed between, and secured to opposed, fibrous substrate layers; at least one line of perforations, each of said lines of perforations being provided by spaced, discrete cut segments interconnected by uncut regions; at least a segment of at least one reinforcing thread being disposed in an uncut region, the tensile strength of the segments of said reinforcing threads disposed in said uncut regions being lower than the tensile strength of segments of said reinforcing threads disposed outside of said uncut regions to permit easy separation of said laminated structure along each of said lines of perforations; the integrity of said opposed fibrous substrate layers in said uncut regions being maintained.

2. The laminated structure according to claim 1, wherein each fibrous layer is comprised of at least one ply of cellulosic wadding.

3. The laminated structure according to claim 2, comprising a plurality of lines of perforations, each of said lines of perforations being spaced from each other to define discrete sheets which are separable at each line of perforations.

4. The laminated structure according to claim 3, wherein said laminated structure is in roll form.

5. The laminated structure according to claim 2, wherein the segments of reinforcing threads in said uncut regions are crushed.

6. The laminated structure according to claim 2, wherein said opposed substrate layers of cellulosic wadding in uncut regions of said lines of perforations have a higher tensile strength than the reinforcing threads in said uncut regions.

7. The laminated structure according to claim 6, wherein the tensile strength of segments of reinforcing threads in said uncut regions are substantially destroyed.

8. The laminated structure according to claim 2, wherein said reinforcing threads are comprised of rayon fibers.

9. The laminated structure according to claim 2, wherein said reinforcing threads are comprised of cotton fibers.

10. The laminated structure according to claim 2, wherein said reinforcing threads are comprised of polyester fibers.

11. The laminated structure according to claim 2, wherein said reinforcing threads are comprised of glass fibers.

12. A laminated structure according to claim 2, wherein said reinforcing threads are comprised of polypropylene fibers.

13. The laminated structure according to claim 2, wherein said reinforcing threads are comprised of polyethylene fibers.

14. The laminated structure according to claim 2, wherein said reinforcing threads are disposed in a woven web between said substrate layers.

15. The laminated structure according to claim 2, wherein said reinforcing threads are disposed in a non-woven, cross-laid array between said substrate layers.

16. The laminated structure according to claim 15, wherein said cross-laid threads are adhesively secured to each other and to said substrate layers.

17. The laminated structure according to claim 16, wherein each substrate layer is comprised of at least two plies of cellulosic wadding.

18. A laminated structure comprising reinforcing threads disposed between, and secured to opposed, fibrous substrate layers; at least one line of perforations, each of said lines of perforations being provided by spaced, discrete cut segments interconnected by uncut regions; at least a segment of at least one reinforcing thread being disposed in an uncut region, the tensile strength of the segments of said reinforcing threads disposed in said uncut regions being lower than the tensile strength of segments of said reinforcing threads disposed outside of said uncut regions to permit easy separation of the laminated structure along each of said lines of perforations; the tensile strength of each of the fibrous substrate layers in said uncut regions being greater than the tensile strength of the segments of the reinforcing threads in said uncut regions.

19. The laminated structure according to claim 18, wherein each fibrous layer is comprised of at least one ply of cellulosic wadding.

20. The laminated structure according to claim 19, wherein the tensile strength of segments of reinforcing threads in said uncut regions is substantially destroyed.

21. The laminated structure according to claim 19, wherein said reinforcing threads are disposed in a woven web between said substrate layers.

22. The laminated structure according to claim 19, wherein said reinforcing threads are disposed in a non-woven, cross-laid array between said substrate layers.

23. The laminated structure according to claim 22, wherein said cross-laid threads are adhesively secured to each other and to said substrate layers.

* * * * *